Jan. 16, 1962   J. F. JAEGER ETAL   3,017,068
HANDLE ASSEMBLY
Filed Nov. 27, 1959   2 Sheets-Sheet 1
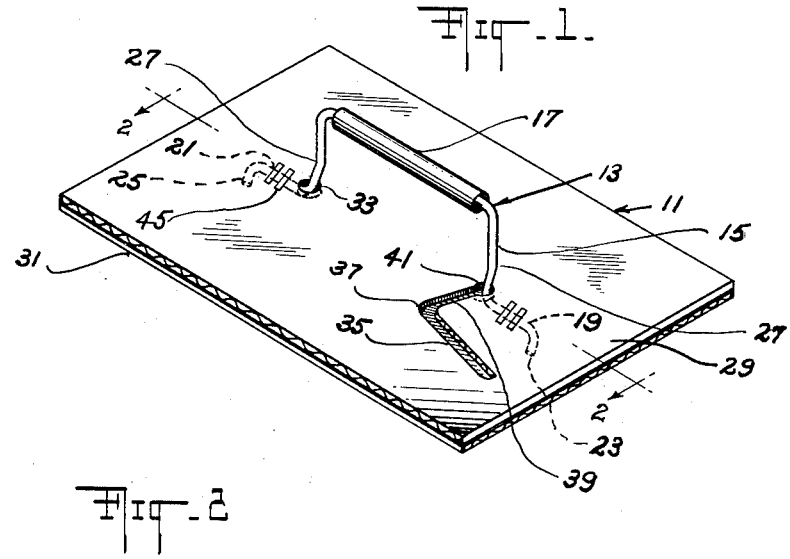
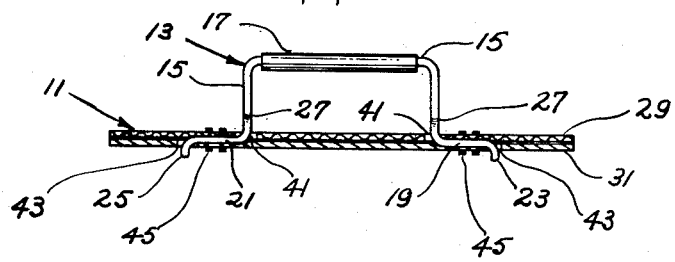
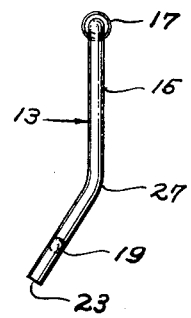
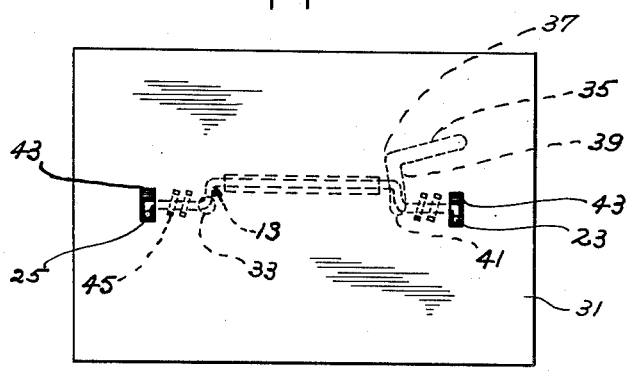
INVENTORS
WILLIAM JOSEPH GILES
JOSEPH F. JAEGER
BY
Raymond F. Kramer
ATTORNEY Jan. 16, 1962 J. F. JAEGER ETAL 3,017,068
HANDLE ASSEMBLY
Filed Nov. 27, 1959 2 Sheets-Sheet 2
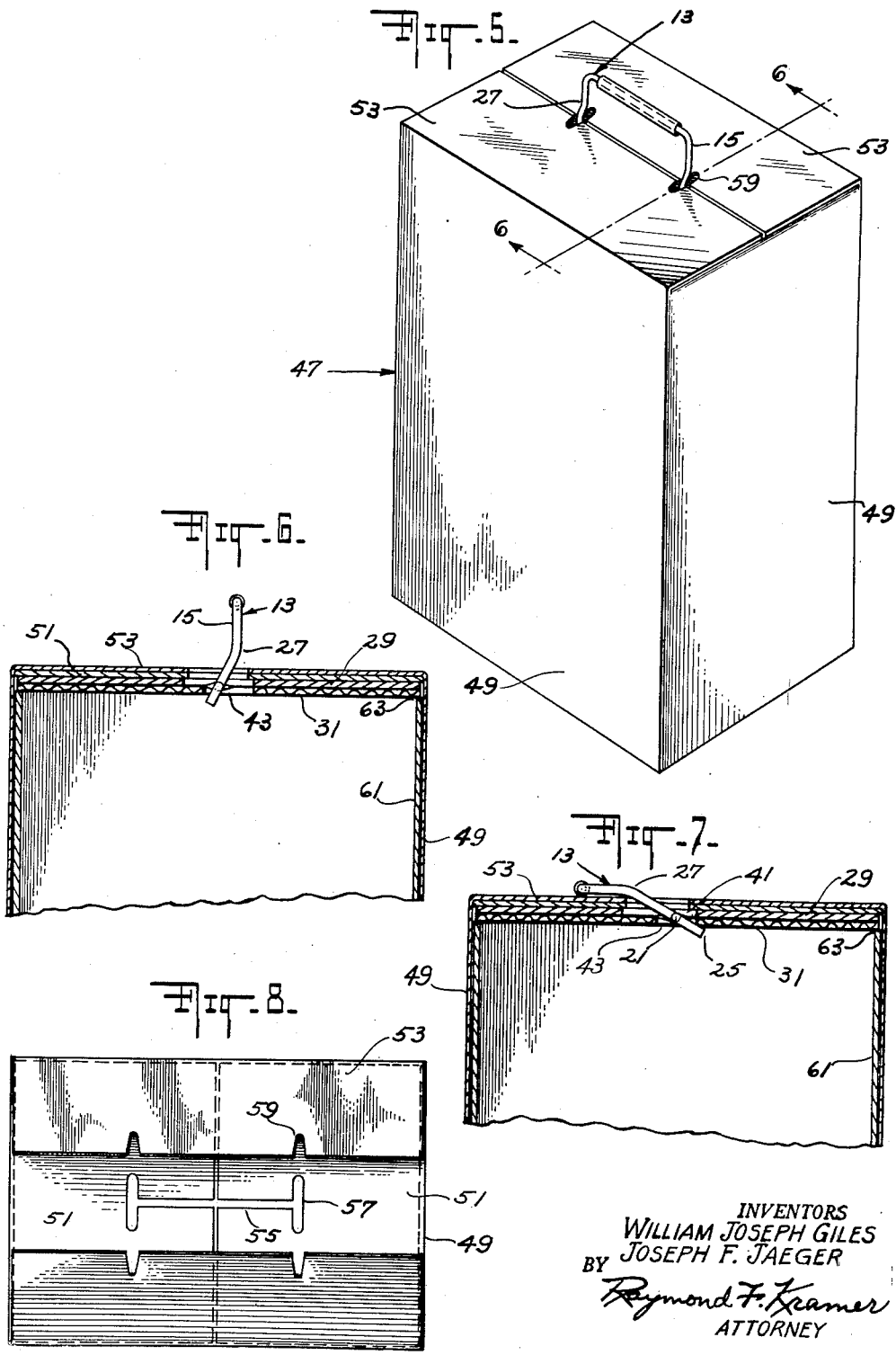
INVENTORS
WILLIAM JOSEPH GILES
BY JOSEPH F. JAEGER
Raymond F. Kramer
ATTORNEY

United States Patent Office 3,017,068
Patented Jan. 16, 1962

3,017,068
HANDLE ASSEMBLY
Joseph F. Jaeger, Oakland, and William Joseph Giles, Butler, N.J., assignors to Colgate-Palmolive Company, New York, N.Y., a corporation of Delaware
Filed Nov. 27, 1959, Ser. No. 855,789
6 Claims. (Cl. 229—52)

This invention relates to a handle assembly. More specifically, the invention relates to a wire handle and handle assembly for use with paperboard cartons to facilitate carrying such cartons in a convenient manner.

Wire handles have been used in the past in conjunction with paperboard boxes and containers. Various designs of handles have been suggested and several methods for inserting and joining the handles to the boxes have been described. Although the known handles have been useful for the intended purposes, many of them were not primarily made for use with heavily loaded cartons and would not be readily adapted for such purpose. Others of these handles were of complex design ill suited for manufacture by modern production techniques or were costly to manufacture for other reasons. The present invention is of an economical handle which is of sufficient strength to allow it to support heavy cartons, e.g., economy and home laundry size packages of washing compositions, weighing from 5 to 20 pounds per carton, and yet is of a simple functional construction which makes possible a neat and attractive package and can be manufactured by automatic machinery with the use of materials which are well known in the packaging art and are inexpensive, readily available and easy to cut and shape.

In accordance with this invention there is provided a handle assembly for a carton which comprises a handle having hand hold and end portions, an upper supporting member having a perforation and an L-shaped opening for insertion of the handle ends, said perforation and opening being located so that when the handle is inserted and positioned the upper support is above the handle ends and is uninterrupted by the perforation and L-opening and a lower supporting member below the handle and upper support and fastened to the upper support so as to hold the handle ends in desired position between the supporting members. The structure, functions and advantages of the present invention will be apparent from reference to the following detailed description of a preferred embodiment thereof taken in conjunction with the drawings in which:

FIG. 1 is a perspective of a handle assembly, illustrating the handle in normal raised carrying position;

FIG. 2 is a vertical sectional elevation along plane 2—2;

FIG. 3 is a bottom plan of the handle assembly;

FIG. 4 is an end elevation of the handle alone;

FIG. 5 is a perspective illustrating the handle in place atop a carton;

FIG. 6 is a partial vertical section along plane 6—6;

FIG. 7 is a partial vertical section like that of FIG. 6 but illustrating the handle in position flat against the top of the carton, as it is placed for stacking of cartons; and FIG. 8 is a top plan of the carton sans handle assembly, the upper flaps being partially raised to expose the slots in the lower flaps, the illustrated slots fitting about the handle.

Numeral 11 designates a handle assembly which is preferably placed inside a carton of material to be transported with the handle portion 13 held beneath the upper sealing carton flaps. Handle 13 comprises a hand hold portion 15 which may also be considered to be any suitable bail. The U-shaped hand hold 15 has a sleeve portion 17 covering the horizontal or U-bottom part thereof. Handle 13 has end portions 19 and 21 which are aligned and, in the embodiment illustrated extend in opposite directions. The ends of these portions 19 and 21 are bent downwardly as shown as 23 and 25. Also in the handle shown, at or about the places 27 where the handle portion joins the oppositely extending ends the handle is bent transversely at an obtuse angle, usually nearer to 180° than to 90°.

In addition to the handle itself the present handle assembly also comprises flat upper and lower supporting members, 29 and 31, respectively. As illustrated, these are made of corrugated paperboard, each having straight and parallel corrugations. In the views given the corrugations of the two supports are shown at right angles for maximum strength under load. It is also possible and sometimes may even be more desirable to reverse the directions of the corrugations so that the lower board would have corrugations running transversely of the handle. Also, it is within this invention to make both upper and lower supporting members from a single piece of corrugated paperboard folded along one of the edges.

Upper supporting member 29 contains two perforations for insertion of handle ends 19 and 21. End 21 is inserted through perforation 33, shown as a circular hole, followed by placement of end 19 through leg 35 of L-shaped slot 37, after which the handle end is moved along leg 39 to use position 41. Leg 35 of L-opening 37 is along a part of a radius extending from the center of hole 33 and arcuate leg 39 is along an arc of a circle drawn from the same center. It will be noted that when handle 13 is in erect position the upper support below the handle is uninterrupted by either the perforation or L-opening. The continuity of the paperboard in this area promotes increased strength of the structure and helps to prevent distortion of the support when a lifting force is applied to the handle. It is also clear that the hole 33 and L-shaped slotted opening 37 are separated by a substantial area of paperboard, further increasing the strength of the upper support in comparison to those handle assemblies having continuous slits connecting perforations for the handles in similar supports.

Lower supporting member 31 is also constructed of corrugated paperboard with straight parallel corrugations. This support is approximately the same size as upper paperboard 29 and is of the same rectangular shape. It contains two holes 43 of sufficient size and suitable shape to allow insertion and transverse movement of bent handle ends 23 and 25.

Staples 45 pierce upper and lower supporting members and are clinched at their lower ends to firmly fasten the corrugated boards about handle 13 in its desired position.

The completed handle assembly may be quickly positioned and sealed in a carton of material which may be conveniently carried by the handle without danger of tearing of the carton material or slipping loose of the handle. In FIG. 5 there is shown the exterior of a carton to which the handle assembly has been attached. Carton 47 has a closed bottom, usually comprising glued flap members, sometimes with a reinforcing corrugated bottom board (not shown). The side walls 49 of the carton are unitary with the bottom and top flaps. The top carton flaps are four in number, a pair of inner flaps 51 and outer flaps 53. The inner flaps contain longitudinal slots 55 which terminate in transverse slots 57. Outer flaps 53 contain comparatively short end slots 59. As will be clear from the illustrations, the carton flap slots allow folding of the flaps over the inserted handle.

In the paperboard cartons designed for carrying heavier loads of materials it is often advantageous to include corrugated board liners to prevent distortion of the carton during shipment and storage. Such a carton liner, extending from bottom to near the top of the carton, is represented by numeral 61. The handle assembly fits inside the carton and rests atop liner 61 at 63. It will be seen that the supporting members of the handle assembly also serve as additional reinforcing "liners" for the carton. The manufacture of the handle assembly of this invention is preferably according to the following steps. Handle 13, preferably of steel or other strong wire, is bent to shape by automatic machinery with sleeve 17 slipped over handle portion 15 in this operation. Next, end 25 is inserted through hole 33 of support 29 and pushed through until end portion 21 is below the supporting member. The other end 19 of the handle is moved downwardly through slot 35 and is then moved sidewardly through arcuate slot 39 to final position at 41. Lower supporting member 31 is then placed in registry under the upper support 29 so that handle ends 23 and 25 may project through holes 43. Staples 45 are then applied, straddling the handle ends and usually at an angle to the longitudinal axis of the handle.

With the stapling of the supports together about the handle the manufacture of the handle assembly is complete. It will be seen that the handle is free to rotate about an axis through the horizontal ends thereof and can be folded flat against the upper support or against the top of a carton in which it is placed, to facilitate stacking. It is possible to so form the perforation and L-slot that the walls of these openings will prevent the handle from being moved through an arc of more than about 90°. Thus, it will have only flat and upright positions and cannot be mistakenly folded in the almost flat position which hinders stacking.

The handle assembly may be shipped and stored in flat form until ready for insertion in the cartons. To effect such insertion the carton top flaps are opened and the handle assembly is placed atop the inner liner, the carton having previously been filled with material to be shipped. The slotted flaps are then glued and sealed in place, firmly holding the handle assembly within the carton. Although it may sometimes be desirable, it is not necessary to glue the handle assembly to the carton flaps and in the absence of such gluing it is an easy matter to remove the assembly and dispose of it when the carton has been transported to its point of use.

The present invention has been described in conjunction with drawings of a specific embodiment thereof. The invention is not limited to the specific structure shown and modifications may be made and equivalents may be substituted without departing from the spirit of the invention or going outside the scope of the claims. Thus, the shape of the perforation in the upper member may be altered and in some instances it may be desired to utilize two L-shaped slots. The L need not be one whose legs meet at right angles, both acute and obtuse intersections being useful in some cases. The handle ends need not necessarily be extending in opposing directions. Instead of staples other fastening means may be employed to hold the supporting members together about the handle ends. The major feature of the invention is in the structure and means of inserting and attaching the handle to the pair of supports and other embodiments which utilize the essential structure and concept of the invention, as described in the claims, are within the scope thereof.

What is claimed is:

1. A handle assembly for a carton which comprises a handle having hand hold and end portions, an upper supporting member having a perforation and an L-shaped opening for insertion of the handle ends, said perforation and opening being located so that when the handle is inserted and positioned the upper support is above the handle ends and is uninterrupted by the perforation and L-opening in the area below the handle and a lower supporting member below the handle and upper support and fastened to the upper support so as to hold the handle ends in desired position between the supporting members.

2. A handle assembly for a carton which comprises a wire handle having a hand hold part and aligned end portions extending therefrom, a flat upper supporting member having a perforation and an L-shaped opening for insertion of the handle ends, said perforation and opening being separate and located so that when the handle is inserted and positioned the upper support is above the handle ends and is uninterrupted by the perforation and L-opening in the area below the handle and a flat lower supporting member below the handle and upper support and fastened to the upper support so as to hold the handle ends confined between the supporting members to restrict movement thereof and hold the handle in desired position.

3. A handle assembly for a carton which comprises a wire handle having a hand hold part and aligned end portions extending therefrom in opposite directions, a flat corrugated paperboard upper supporting member having a perforation and an L-shaped opening for insertion of the handle ends, said perforation and L-opening being separate and located so that when the handle is inserted and positioned the upper paperboard support is above the handle ends and is uninterrupted in the area below the handle by the perforation and L-opening and a flat corrugated paperboard lower supporting member below the handle and upper paperboard support and fastened to the upper paperboard so as to hold the handle ends confined between the supporting members to restrict movement thereof and hold the handle in desired position.

4. A handle assembly for a carton which comprises a wire handle having a hand hold part and aligned end portions extending therefrom in opposite directions, a flat corrugated paperboard upper supporting member with parallel straight corrugations having a hole and an L-shaped opening through the thickness of the corrugated paperboard, the hole and L-opening being suitable for insertion of the handle ends by placement of one end through the hole and under the upper support followed by placement of the other end through a leg of the L-opening and positioning said end under the upper support by sliding along the other leg of the L, the hole and L-opening being separate and located so that when the handle is inserted and positioned the upper paperboard support is above the handle ends and is uninterrupted by the hole and L-opening in the area below the handle and a flat corrugated paperboard lower supporting member below the handle and upper paperboard support with straight parallel corrugations and fastened to said upper support with staples which go through both paperboards and straddle the handle ends so as to hold the handle ends between the supporting members preventing transverse movement thereof, and the handle ends being bent downwardly and the lower support having holes therein through which said bent ends project, so that longitudinal movement of the ends due to the application of a lifting force on the handle and distortion of the wire will be prevented by bearing of the bent end portions against the walls of the holes in the lower support.

5. A handle assembly for a carton which comprises a wire handle having a hand hold part and aligned end portions extending therefrom in opposite directions, a flat corrugated paperboard upper supporting member with parallel straight corrugations, having a circular hole and an L-shaped opening through the thickness of the corrugated paperboard, one leg of the L being along a radius of a circle, the center of which is the center of the circular hole and the other leg of which is arcuate and is an arc of a circle with the same center, the hole and L-opening being for insertion of the handle ends by placement of one end through the hole and under the upper support, placement of the other end through a leg of the L-opening and positioning said end under the upper support by sliding it along the arcuate leg of the L, the hole and the L-opening being separate and located so that when the handle is inserted and positioned the upper paperboard support is above the handle ends and is uninterrupted by the hole and L-opening in the area below the handle and a flat corrugated paperboard lower supporting member below the handle and upper paperboard support and of the same size as the upper support, with straight parallel corrugations and fastened to said upper support with staples which go through both paperboards and straddle the handle ends so as to hold the handle ends between supporting members and prevent transverse movement and limit longitudinal movement thereof, the handle ends being bent downwardly and the lower support having holes therein through which said bent ends project so that longitudinal movement of the handle ends due to the application of a lifting force on the handle and distortion of the wire will be prevented by bearing of the bent end portions against the walls of the holes in the lower support, the handle also being bent transversely at an obtuse angle near where the handle portion joins the oppositely extending ends so as to facilitate stacking of cartons to which the handle may be attached by allowing the handle to be folded flat parallel to the handle assembly supporting members.

6. A carton and handle assembly therefor which comprises a paperboard carton having a closed bottom, side walls and a top having two pairs of opposing inner and outer flaps, a liner of corrugated board inside the side walls of the carton and extending from top to bottom thereof, a handle having hand hold and end portions and bent at an obtuse angle where such portions meet, a lower handle assembly supporting member adapted to rest on the carton liner, an upper supporting member having a perforation and an L-shaped opening for insertion of the handle ends, said perforation and opening being located so that when the handle is inserted and positioned the upper support is above the handle ends and is uninterrupted by the perforation and the L-opening in the area below the handle, the upper and lower supporting members being fastened together with handle ends between them to hold the handle in desired position, a pair of slotted inner carton flaps which fold to closed position over the upper support substantially covering the cross-section of the carton and, held to the inner flaps, a pair of outer flaps which also fold to closed position substantially covering the carton cross-section and have end slots which overlie the aforesaid lower slots, the carton slots being adapted to fit about the handle and facilitate folding the handle flat when said cartons are stacked atop one another.

References Cited in the file of this patent
UNITED STATES PATENTS

| | | |
|---|---|---|
| 2,093,616 | Mo | Sept. 21, 1937 |
| 2,196,055 | Carta | Apr. 2, 1940 |
| 2,723,075 | Mitchell | Nov. 8, 1955 |